Patented June 8, 1937

2,083,041

UNITED STATES PATENT OFFICE 2,083,041

MANUFACTURE OF ARTIFICIAL FILAMENTS

Johann Joseph Stoeckly and Richard Bartunek, Teltow, near Berlin, Germany, assignors to North American Rayon Corporation, a corporation of Delaware No Drawing. Application April 1, 1933, Serial No. 664,027. In Germany July 4, 1932

1 Claim. (Cl. 106—40)

The present invention has to do with a new and novel process for preparing artificial filaments which possess a desirable low lustre.

An object of the present invention is to provide a new process for producing such filaments, the process being such that the difficulties hitherto experienced are overcome. The following short discussion will point out some of the difficulties experienced with the known processes.

Many inorganic pigments have been employed in the manufacture of low lustre filaments, for example, from viscose and cuprammonium solutions. It has been found, however, that due to the low covering power of the pigments it is necessary that large quantities of the substances be employed. In accordance with the theories of mineral color technology, mineral color pigments possessing an especially high covering power have been used. It has been found, however, that such great quantities of these substances are required in order to produce the low lustre desired, that the physical properties of the resultant filaments are affected. Zirconium oxide is a pigment of the mineral color pigment group mentioned, and we have found that this pigment possesses the draw-backs mentioned. Experiments with zirconium oxide alone, zirconium oxide containing silicates, and zirconium oxide precipitated with barium sulphate, dried and calcined, have shown us that, even when very finely ground, unfavorable results are obtained.

The present invention, therefore, concerns a method for using such a mineral color pigment and a process for so using it that very favorable filaments with an attractive dull lustre, may be obtained. It has been found that very small quantities of the zirconium oxide, ranging between 0.5 and 2%, calculated on the weight of the cellulose present in the solution, may be employed, if simultaneous use is made of an oil-like organic compound. It is preferable that not more than 12% of such an oil-like compound be employed. The use of such a combination of dulling agents has been found to produce a filament, the strength and physical properties of which are not materially altered or affected.

As oils which may be employed, may be mentioned difficultly-volatile organic oil-like compounds; such as mineral oil, in the form, for example, of paraffin oil; vegetable oils, such as olive and castor oils; and animal oils of the type of neat's-foot oil and cod liver oil. These oils tend to remain in the yarn during the aftertreatment steps.

It has been found that in addition to the above-noted oils, or sometimes in place of them, it is advantageous to add a certain percentage of some easily-volatile organic oil-like compound, such as, for example, the distillation products of conifers containing pinen, e. g., pine oil, or some easily volatilized organic ester.

The different components of these addition products may be mixed with the spinning solution in various ways. I have found, however, that it is particularly advantageous to follow a specific procedure. Such a method comprises the steps of thoroughly agitating a mixture of the solid pigment in finely divided form, and the difficulty volatile and/or easily volatile oil-like body (e. g., zirconium oxide, finely divided, is mixed with paraffin oil and/or pine oil), and then this agitated mixture is dispersed in a calculated quantity of the spinning solution (e. g., a viscose solution).

Another method which has been found desirable is to make a paste or suspension of the pigment and the easily volatile oil-like body, and add this to the spinning solution. Subsequently this solution may be emulsified with the difficultly-volatile oil.

Specific example

A zirconium oxide pigment paste of grains averaging about from 1 to 5 microns in size, comprising one part of pigment to three parts of pine oil, is produced. A quantity of this paste, containing 1.5 kilograms of zirconium oxide, is thoroughly mixed with 6 kilograms of light paraffin oil, until a homogeneous and uniform suspension is obtained. To this suspension is then added 2.5 kilograms of pine oil, and the whole is thoroughly mixed. This suspension, consisting of 1.5 kg. of zirconium oxide,
6.0 kg. of paraffin oil, and
3.0 kg. of pine oil, and possessing a total weight 10.5 kg., is then mixed with such a quantity of viscose that the resulting viscose spinning solution contains 1.5% of zirconium oxide, calculated on the cellulose content of the viscose. This solution is then subjected to any necessary ageing and filtering, and then spun in any known manner. The resulting filaments possess a very dull or low lustre, but the physical properties are not materially affected.

The proportions of the difficulty volatile oil and the easily volatile oil-like bodies may be varied within the limits indicated.

In the stead of zirconium oxide, use may be made of germanium oxide or lithopone.

Having now set forth the invention as required by the Patent Statutes, what is claimed is:

In the process of producing dull-lustre filaments the step of adding to a viscose spinning solution prior to extrusion a mixture consisting of 1.5 parts of zirconium oxide, 6 parts of paraffin oil and 3 parts of pine oil in such amount that the final spinning solution contains about 1.5% of zirconium oxide calculated on the weight of cellulose in said spinning solution.

JOHANN JOSEPH STOECKLY.
RICHARD BARTUNEK.